(12) United States Patent  
Koiwai

(10) Patent No.: US 6,373,641 B2  
(45) Date of Patent: Apr. 16, 2002

(54) LENS BARREL

(75) Inventor: Tamotsu Koiwai, Akiruno (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/902,005

(22) Filed: Jul. 10, 2001

(30) Foreign Application Priority Data

Jul. 12, 2000 (JP) .................................... 2000-211576

(51) Int. Cl.$^7$ .............................................. G02B 15/14
(52) U.S. Cl. ........................ 359/700; 359/694; 359/699
(58) Field of Search ................................ 359/694, 699, 359/700, 701

(56) References Cited

U.S. PATENT DOCUMENTS

| | | | | |
|---|---|---|---|---|
| 4,707,083 A | * | 11/1987 | Iizuka et al. | ................. 359/700 |
| 5,210,644 A | * | 5/1993 | Nomura | ....................... 359/694 |
| 5,225,938 A | * | 7/1993 | Nomura | ....................... 359/699 |
| 6,195,211 B1 | * | 2/2001 | Iwasaki | ....................... 359/694 |
| 6,198,578 B1 | * | 3/2001 | Iwasa et al. | ................. 359/699 |

FOREIGN PATENT DOCUMENTS

JP 2000-131588 5/2000

\* cited by examiner

Primary Examiner—Loha Ben  
(74) Attorney, Agent, or Firm—Frishauf, Holtz, Goodman, Langer & Chick, P.C.

(57) ABSTRACT

A lens barrel (lens frame structure) using a cam mechanism with a cam follower is provided in which deviation of engagement of a frame member at an engaging part of the cam-follower is less likely to happen. A cam ring and a lens holding frame of the lens barrel are connected through the cam-follower, with a first cam groove running obliquely to an optical axis and a second cam groove running along the periphery direction of the optical axis. The second cam groove comprises an oblique cam plane and a parallel wall plane, and the cam-follower has a conical surface in sliding contact with the cam plane and a circular ring part in sliding contact with the parallel wall plane. The circular ring part digs into the parallel wall plane and deviation of the cam ring is prevented, if the cam ring comes to be distorted by applying careless stress to the cam follower.

16 Claims, 5 Drawing Sheets

OPTICAL AXIS O DIRECTION

LENS BARREL

This application claims benefit of Japanese Application No. 2000-211576 filed on Jul. 12, 2000, the contents of which is incorporated by this reference.

BACKGROUND OF THE INVENTION

1. Field of the Invention

The present invention relates to the structure of a lens barrel (lens frame structure) having plural frame members capable of moving back and forth relatively.

2. Description of Related Art

One known structure comprises a lens barrel having a lens frame capable of moving back and forth, a mechanism for driving a cylindrical lens frame using a combination of a cam groove run on a bias to an optical axis, and a cam-follower that engages freely with the cam groove. The whole surface of the sliding surface of the cam-follower is in contact with the sliding plane of the cam groove. This design has been used for the structure around the conjugated area of the cam-follower put in the cam groove.

The size of lens frame structure has been getting compact and thickness of the lens frame structure itself has been inclined to be thinner due to the demand for downsizing and weight saving for these products in recent years. In the event of careless stress such as impact to a cam-follower, there is a chance that the lens frame will be distorted and the engagement of the cam and the cam-follower will be pulled out. Also, in the case the cam groove has a parallel side wall, manufacturing the lens frame is difficult because the cam groove may be undercut.

To solve said problem, in the lens frame disclosed in Laid Open Patent Publication 2000-131588, one cam structure has been proposed, applying a cam groove with a V-shape in the cross-section and a cam-follower with a tapered shape. In this cam structure, the phenomenon of digging occurs due to the edge part arranged at the cam-follower with a tapered shape that makes direct contact with the cam groove plane, which is an oblique plane. This results in preventing the cam-follower from pulling out of the cam groove.

The cam structure disclosed in the Laid Open Patent Publication 2000-131588 could prevent the cam-follower and the cam groove from being pulled out by the edge caused by the cam-follower digging into the cam groove plane, which is an oblique plane. However, effecting the prevention of pulling out has not been always achieved for frame structure with extremely weak rigidity in particular, since the plane in direct contact with said edge part is an oblique plane over the area of the cam groove.

SUMMARY OF THE INVENTION

The present invention is made to resolve this problem. The object of the present invention is to provide the lens barrel using the cam mechanism with a cam-follower, where the lens barrel is capable of a smooth driving back and forth and its engaging is unlikely to be pulled out the engaging part of the cam-follower and, in addition, its frame is easy to be manufactured.

The lens barrel of the present invention comprises a first frame having a cam-follower with a conical surface part and a circular ring part where the edge is formed in the outer circumference, and a second frame having the first cam groove engaged and conjugated with sliding only with the conical surface part of the cam-follower and the second cam groove engaged and conjugated with sliding simultaneously with both the conical surface part and the circular ring part of the cam-follower.

Also, the lens barrel of the present invention comprises a first frame having a cam-follower with a conical surface part and a circular ring part where the edge is formed in the outer circumference, and a second frame having the cam groove engaged and conjugated with sliding of both the conical surface part and the circular ring part of the cam-follower.

BRIEF DESCRIPTION OF THE DRAWINGS

The invention is described in detail in the following figures, in which like elements are referred to with like numerals, and in which.

DETAILED DESCRIPTION OF PREFERRED EMBODIMENTS

Figure 1:
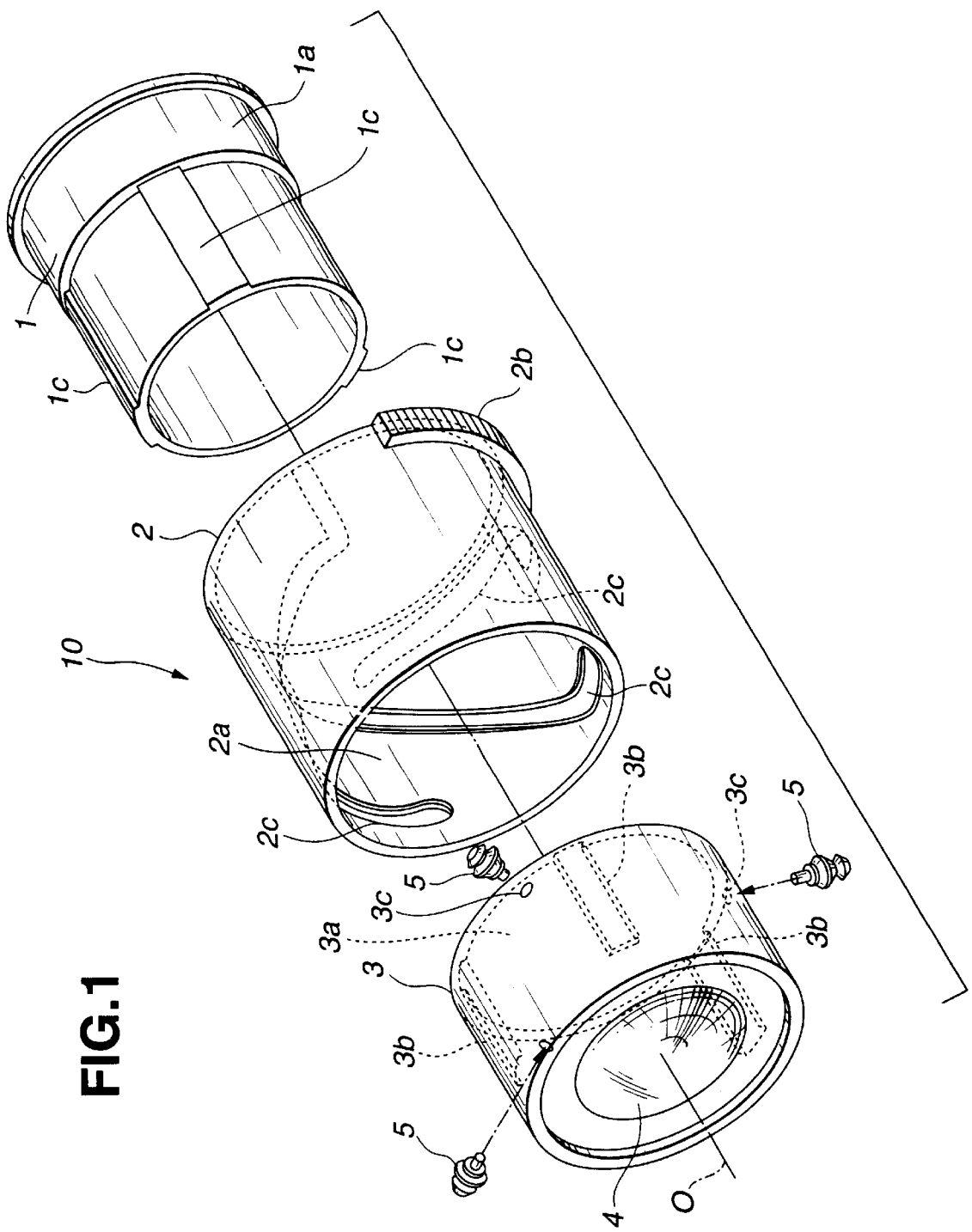
FIG. 1 is an exploded oblique perspective view of a lens barrel of one embodiment related to the present invention.

The embodiment of the present invention will be described referring to the drawings.

Figure 2:
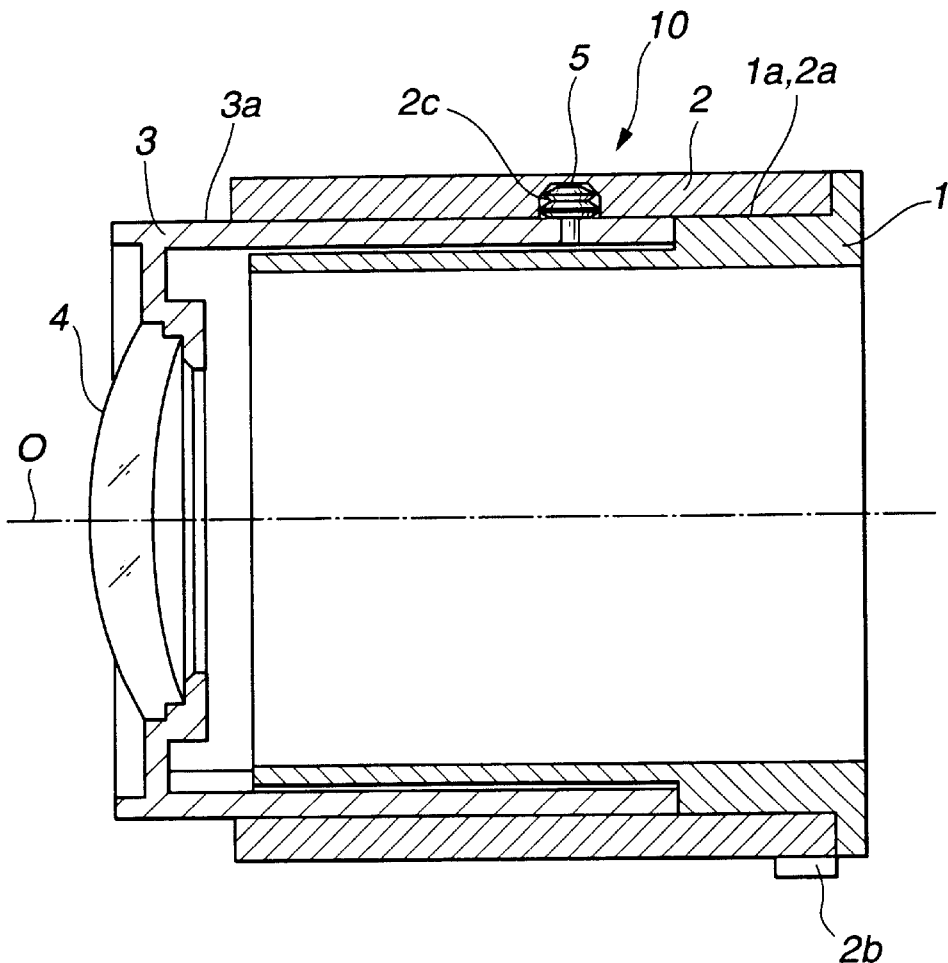
FIG. 2 is a longitudinal sectional diagram of the lens barrel of the embodiment related to the present invention.
Figure 3:
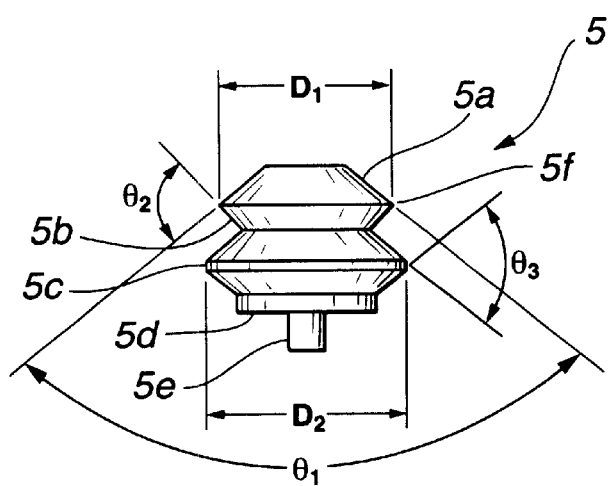
FIG. 3 is a lateral diagram of the cam-follower applying to the lens barrel of the embodiment related to the present invention.
Figure 4:
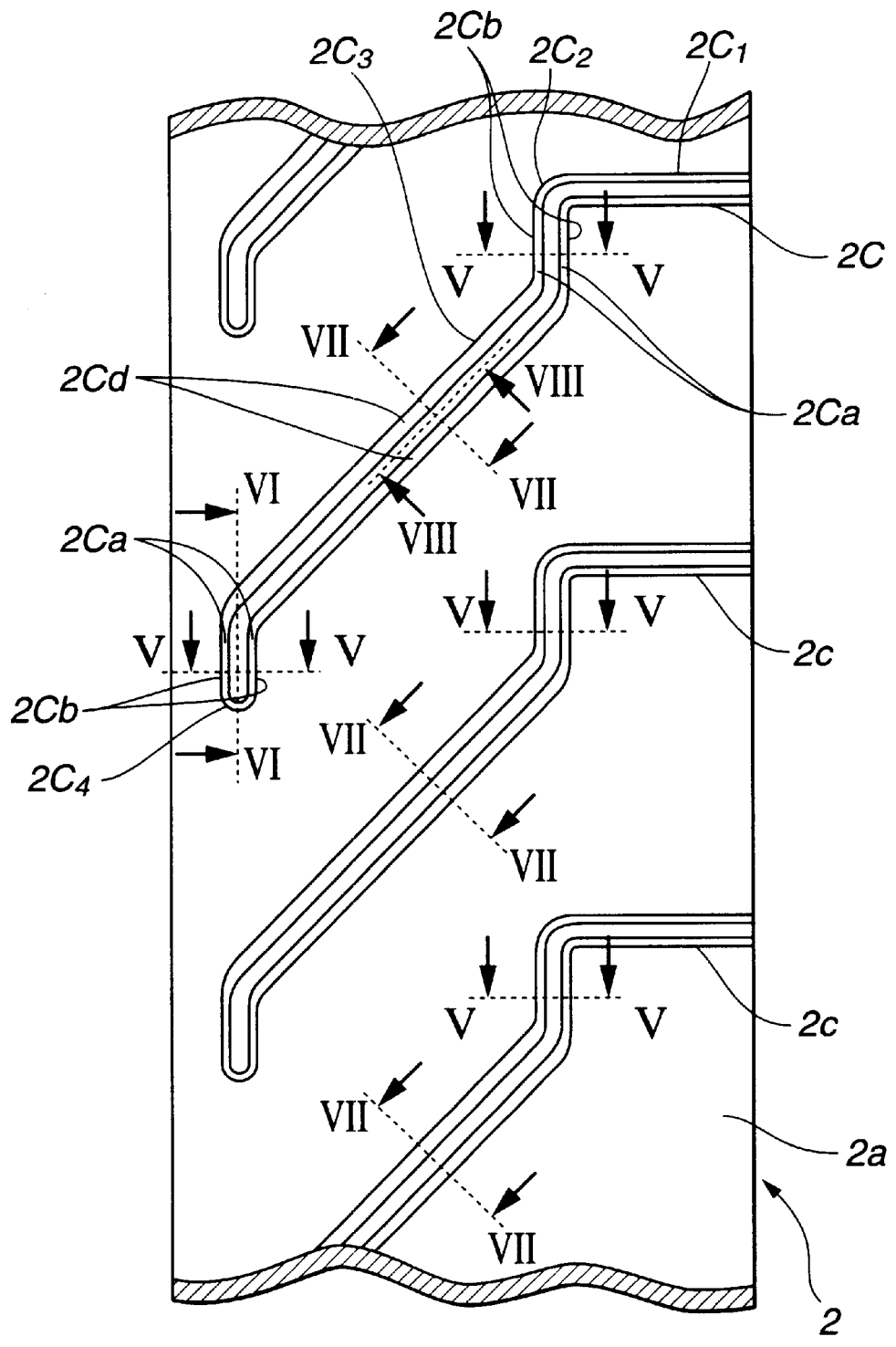
FIG. 4 is a development diagram of the inner circumference showing the shape of the cam groove at the cam ring of the lens barrel of the embodiment related to the present invention.
Figure 6:
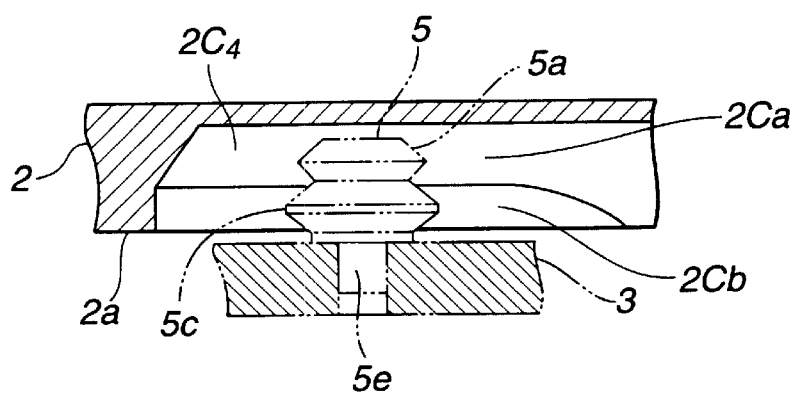
FIG. 6 is a partially sectional diagram of the engaging part of the cam groove and cam-follower of the lens barrel of the embodiment related to the present invention, showing VI—VI section of FIG. 4.
Figure 7:
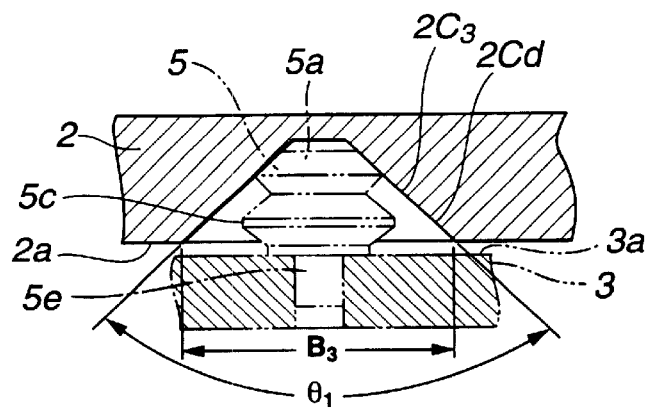
FIG. 7 is a partially sectional diagram of the engaging part of the cam groove and cam-follower of the lens barrel of the embodiment related to the present invention, showing VII—VII section of FIG. 4.
Figure 8:
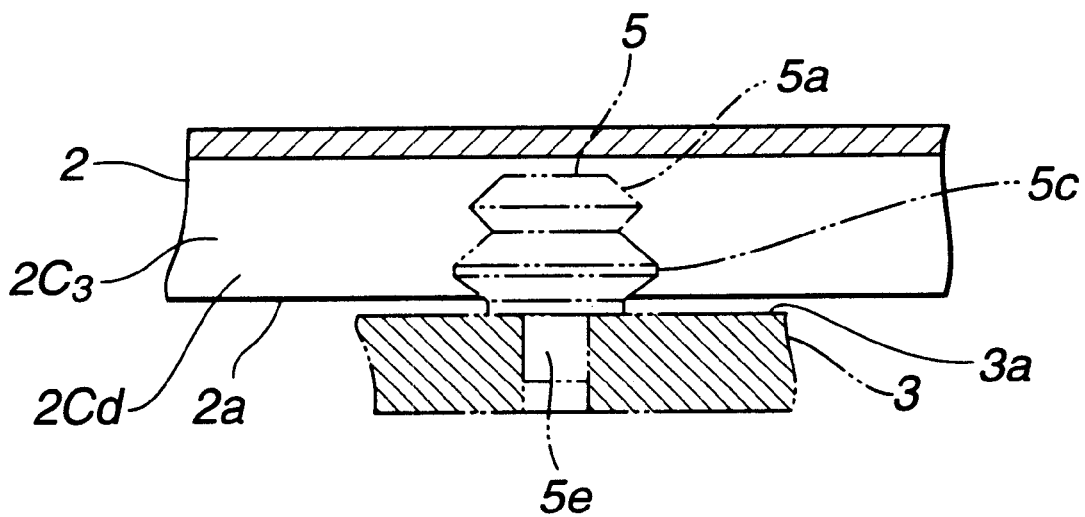
FIG. 8 is a partially sectional diagram of the engaging part of the cam groove and cam-follower of the lens barrel of the embodiment related to the present invention, showing VIII—VIII section of FIG. 4.

FIG. 1 is an exploded oblique perspective view of the lens barrel showing partial elements of the zoom lens barrel of one embodiment related to the present invention. FIG. 2 is a longitudinal sectional diagram of the lens barrel mentioned above. FIG. 3 is a lateral diagram of the cam-follower with the lens barrel mentioned above, and FIG. 4 is a development diagram of the inner circumference surface showing the configuration of the cam groove at the cam ring of the lens barrel mentioned above. FIGS. 5 to 8 are partially sectional diagrams of the engaging part of the cam groove and cam-follower of the lens barrel mentioned above, and FIG. 5 shows V—V section of FIG. 4, FIG. 6 shows VI—VI section of FIG. 4, FIG. 7 shows VII—VII section of FIG. 4, and FIG. 8 shows VIII—VIII section of FIG. 4.

Lens barrel 10 of the embodiment of the present invention comprises a moving frame 1 supported by a fixed frame (not shown) so as to move back and forth, a cam ring 2 supported with rotational ability put into outer surface 1a of moving frame 1, and a holding frame 3 with lens 4, which is supported with movement ability in relative displacement put into inner circumference surface 2a of the cam ring 2 and guided to the optical axis O direction by moving frame 1.

In the cam ring 2 described above, a gear part 2b for rotational drive on the outer circumference of the cam ring 2 is provided, and in the inner circumference 2a fitting partially to the outer circumference surface 1a of moving frame 1, 3 lines of cam grooves 2C are provided. Shapes of cam grooves 2C are described later referring to FIGS. 4 to 8.

The lens holding frame 3 comprises 3 lines of guide grooves 3b that slide freely into 3 lines of straight guides 1c of moving frame 1 in the inner circumference, and cam-follower installation holes 3c on the outer circumference surface 3a at three locations. Three cam-followers 5 are pressed into the cam-follower installation holes 3c and fixed.

The cam-follower 5 comprises a conical surface part 5a in the upper part, a circular ring part 5c, and a flange plane 5d in the lower part, and a shaft part 5e pressed into the installation hole 3c. The conical surface part 5a in the upper part has a conical surface with θ1 at angle of conical surface (2×cone angle) and an edge part with an external diameter D1 (the greatest external diameter of conical surface) formed by an oblique part 5b making angle θ2 with the conical surface. The circular ring part 5c is arranged underneath the oblique part 5b and has an edge part with external diameter D2 having an edge angle θ3. The external diameter of circular ring part 5c has a circumference surface with tube shape and slight width to adjust the width. Size of external diameter D2 is greater than one of external diameter D1.

Cam groove 2C arranged on cam ring 2 comprises 3 portions and the same shape of inner cam grooves as shown in the development figure of the inner circumference of the cam ring 2 of FIG. 4. Each cam groove 2C is a cam groove to introduce a cam-follower.

The introductory groove 2C1 along with the direction of the optical axis O having an opening on the back end plane of the cam ring 2, the cam groove 2C2 which is the second cam groove formed in parallel to the plane perpendicular to the direction of the optical axis O, the cam groove 2C3 which is the first cam groove running obliquely to the direction of the optical axis O and the cam groove 2C4 which is the second cam groove formed in parallel to the plane perpendicular to the direction of the optical axis O are all a junctural cam. For instance a cam to provide the position of zoom wide end of the cam-follower (wide end function) is corresponding to the cam groove 2C2, a cam to provide the position of zoom tele end of the cam-follower (tele end function) is corresponding to the cam groove 2C4 and a cam to provide zoom area between wide end and tele end of the cam follower is corresponding to the cam groove 2C3.

Figure 5:
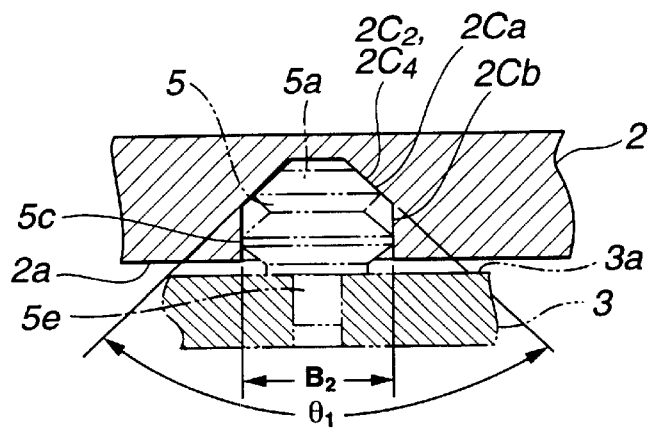
FIG. 5 is a partially sectional diagram of the engaging part of the cam groove and cam-follower of the lens barrel of the embodiment related to the present invention, showing V—V section of FIG. 4.

Sectional shape at a right angle of the cam groove 2C2 and 2C4 is a shape having oblique plane part 2Ca with the same angle as conical surface angle θ1 of the cam-follower 5 as shown in sectional view of FIG. 5, and a pair of parallel wall planes 2Cb perpendicular to the direction of moving (optical axis O) toward the inner circumference surface from the oblique plane. The groove width of the pair of parallel wall planes 2Cb is nearly the same as the external diameter D2 of the circular ring part and has the groove width B2 which can be fitted for the circular ring part 5c in such status that the gap is so narrow that the circular ring part 5c of the cam-follower 5 could manage to slide smoothly. In the connection part of the cam groove 2C2 and 2C4 with the cam groove 2C3, the height of the parallel wall plane 2Cb mentioned above gets lower gradually. (Refer to FIG. 6)

As far as cam groove 2C3 is concerned, its sectional shape at right angle of the cam groove 2C3 is formed by oblique plane part 2Cd whose angle is equal to conical angle θ1 of the cam-follower 5 shown in sectional view of FIG. 7. Its oblique plane is extended to inner circumference surface 2a of the cam ring 2, and opening groove width B3 on the inner circumference is greater than the external diameter D2 at the circular ring of the cam-follower.

Among cam grooves 2c, sectional shape at right angle of the groove of introductory groove 2C1 is the same shape as the cam groove 2C2. But there is no limitation if the cam-follower 5 has a shape that is insertable.

As far as lens barrel 10 of embodiment in the present invention having the configuration described above, the cam-follower 5 of the lens holding frame 3 is put in place to be engaged and slid with the cam groove 2C of the cam ring 2. When the cam ring 2 is subject to rotation by the gear 2b, the cam-follower 5 slides along the cam groove 2C. At that time, when the cam-follower 5 is in the area of the cam groove 2C2 or the cam groove 2C4, the lens holding frame 3 is not subject to be driven back and forth, only the cam ring 2 rotates with respect to the moving frame 1. If the cam-follower 5 is in the area of the cam groove 2C3, when the cam ring 2 rotates, the lens holding frame 3 is subject to be driven back and forth in the direction of the optical axis O by the cam groove 2C3 and the cam-follower 5 as cam means.

When the cam-follower 5 is engaged with the cam groove 2C3, conical surface 5a of the cam-follower 5 is in contact with the oblique plane 2Cd as shown in FIG. 7. In the above state, when the cam ring 2 is driven or stationary and when any unnecessary or careless stress is applied to the lens holding frame 3, the cam-follower 5 will receive the lateral pressure, and the frame member will be distorted and will be deviated off cam groove 2C3. The edge 5f in the low end of the conical surface part 5a of the cam-follower 5 will dig into the oblique plane part 2Cd of the cam groove and the force for the prevention of deviation will be generated. Therefore, the deviation by distortion of the cam ring 2 and the lens holding frame 3 is prevented.

On the other hand, in the state that the cam-follower 5 is engaged with the cam groove 2C2 or 2C4, the conical surface 5a gets in direct contact with the oblique plane 2Ca of the cam groove as shown in FIG. 5, and at the same time the edge of the circular ring 5C of the cam-follower gets in direct contact with the parallel wall plane 2Cb as well.

In the above state, when the cam ring 2 is driven or stationary and when any unnecessary or careless stress is applied to the lens holding frame 3, the cam-follower 5 will receive lateral pressure, and the frame member will be distorted and be deviated off cam groove. The edge 5f in the low end of the conical surface 5a of the cam-follower will dig into oblique plane 2Ca of the cam groove, and moreover edge part of the circular ring 5c will dig into parallel wall plane 2Cb and force for prevention of deviation will be generated. The force prevents the deviation by distortion of the cam ring 2 and the lens holding frame 3. In this case, edge of the circular ring 5c will dig into the parallel wall plane 2Cb, parallel to the direction where the cam-follower pulls off the cam groove. As a result, the force by digging works effectively and prevents deviation of the frame member with more certainty.

Lens barrel 10 of the embodiment of the present invention as described above presents smooth driving back and forth of the lens holding frame 3, and at the same time, when the cam-follower 5 is engaged with the cam groove 2C3 of the cam ring 2, or with the cam groove 2C2 and 2C4, the lens barrel 10 prevents the cam ring 2 and the lens holding frame 3 from being deviated with more certainty, as the cam-follower 5 is unlikely to be deviated off each cam groove, if any stress is applied to the cam-follower 5 through the frame member.

This is especially true, if there are usual settings for the wide angle end or the telephoto end, as a zoom state of the lens barrel 10, at that time, the cam-follower 5 is engaged with the cam groove 2C2 or 2C4. Therefore, the edge of the cam-follower 5 digs into the parallel wall plane 2Cb as described above. As its force by digging works effectively, in most of cases, deviation of the cam ring 2 and the lens holding frame 3 can be prevented.

In addition, the cam groove 2C2 and 2C4 of the cam ring 2 have parallel wall plane 2Cb perpendicular to the optical axis O. But the groove direction of the cam groove runs along the periphery direction perpendicular to the optical axis O and the rest of the cam groove has oblique plane open to the optical axis O. Therefore, even if the sliding direction of the molding die for the cam groove of the cam ring 2 is perpendicular to the optical axis O, no production of an undercut part makes manufacturing easy.

The mechanism of edge of the cam-follower 5 digging into the contacting plane of the cam groove emerges remarkably in case the cam ring 2 and/or the lens holding frame 3 are molded parts made of synthetic resins, and the cam-follower 5 is metal parts.

The greatest external diameter of the conical surface in the cam-follower of the embodiment of the present invention is different from an external diameter of the circular ring. The second groove width can be made with the same diameter as an external diameter of the circular ring.

In the embodiment, the second cam groove is formed on the circumference of the circular cylinder frame crossed with the plane perpendicular to the optical axis. But it is not necessary that the second cam groove be made on this circumference, if dies cutting by injection molding are feasible. The second cam groove can be made in direction oblique to the optical axis.

Moreover, a groove is provided at the axis 5e of the cam-follower 5 and edge generated by formation of the groove is located in the installation hole of the frame 3. Then, making the edge dig in the hole, the stress can make engagement of the edge part and the hole stronger.

A lens barrel using the cam mechanism with a the cam follower, makes feasible a smooth driving back and forth, with the deviation engagement of a frame member at the engaging part of a cam-follower is less likely to happen. In addition, manufacturing of the frame member is easy.

While this invention has been described in conjunction with the specific embodiments thereof, it is evident that many alternatives, modifications, and variations will be apparent to those of ordinary skill in the art. Accordingly, preferred embodiments of the invention as set forth herein are intended to be illustrative, not limiting. These are changes that may be made without departing from the spirit and scope of the present invention.

What is claimed is:

1. A lens barrel comprising:
    a first frame in which a cam-follower is provided, said cam-follower including: (i) a conical surface part, and (ii) a circular ring part having an edge formed in an outer circumference thereof; and
    a second frame having a first cam groove engaged and slidingly conjugated with the conical surface part of the cam-follower, and a second cam groove engaged and slidingly conjugated with both the conical surface part and the circular ring part of the cam-follower.

2. A lens barrel according to claim 1, wherein a width of the first cam groove is wider than a width of the second cam groove.

3. A lens barrel according to claim 1, wherein the first cam groove and the second cam groove are formed continuously with each other.

4. A lens barrel according to claim 1, wherein an external diameter of the circular ring part is greater than a greatest external diameter of the conical surface part, and is formed inside an imaginary conical surface formed along the conical surface part.

5. A lens barrel according to claim 1, wherein the second cam groove comprises a pair of parallel planes, and the circular ring part of the cam-follower is positioned between the parallel planes.

6. A lens barrel according to claim 1, wherein the first frame and the second frame move relatively, and the second cam groove is formed along a plane perpendicular to a moving direction in which the first frame is driven by the first cam groove.

7. A lens barrel according to claim 1, wherein the first cam groove is engaged and slidingly conjugated with the cam-follower so as to provide a zoom function to the lens barrel, and the second cam groove is engaged and slidingly conjugated with the cam-follower so as to provide at least one of a telephoto-end function and a wide angle-end function to the lens barrel.

8. A lens barrel according to claim 1, wherein the first cam groove and the second cam groove have a common inclined plane that is engaged and slidingly conjugated with the conical surface part of the cam-follower.

9. A lens barrel according to claim 8, wherein an edge of the conical surface part of the cam-follower that is formed with a greatest external diameter is in constant contact with the inclined plane.

10. A lens barrel comprising:
    a first frame in which a cam-follower is provided, said cam-follower including: (i) a conical surface part, and (ii) a circular ring part having an edge formed in an outer circumference thereof; and
    a second frame having a cam groove that is engaged and slidingly conjugated with both the conical surface part and the circular ring part of the cam-follower.

11. A lens barrel according to claim 10, wherein an external diameter of the circular ring part is greater than a greatest external diameter of the conical surface part, and is formed inside an imaginary conical surface formed along the conical surface part.

12. A lens barrel according to claim 10, wherein the cam groove comprises a first cam groove portion and a second cam groove portion, and the second cam groove portion comprises a pair of parallel planes, and wherein the circular ring part of the cam-follower is positioned between the parallel planes.

13. A lens barrel according to claim 10, wherein the first frame and the second frame move relatively, and the cam groove is formed along a plane perpendicular to a moving direction in which at least one of the first frame and the second frame moves.

14. A lens barrel according to claim 10, wherein the cam groove is engaged and slidingly conjugated with the cam-follower so as to prevent the first frame and second frame from moving in relative displacement in an optical axis direction.

15. A lens barrel according to claim 10, wherein an edge of the conical surface of the cam-follower that is formed with a greatest external diameter digs into a surface of the cam groove slidingly conjugated therewith.

16. A lens barrel comprising:

a first frame in which a cam-follower is provided, said cam-follower including: (i) a conical surface part, and (ii) a circular ring part having an edge formed in an outer circumference thereof; and a second frame having a first cam groove engaged and slidingly conjugated with the conical surface part of the cam-follower, and a second cam groove engaged and slidingly conjugated with at least the circular ring part of the cam-follower.

\* \* \* \* \*